Oct. 27, 1931.  J. W. WHITE  1,829,575
WHEEL
Filed Jan. 3, 1929  2 Sheets-Sheet 1
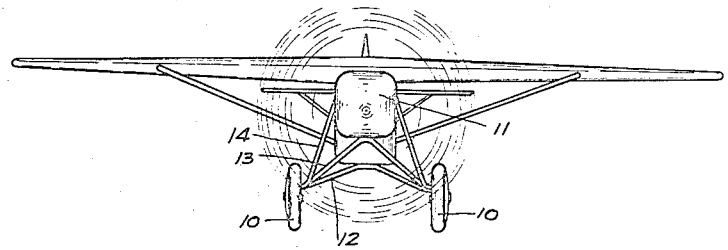
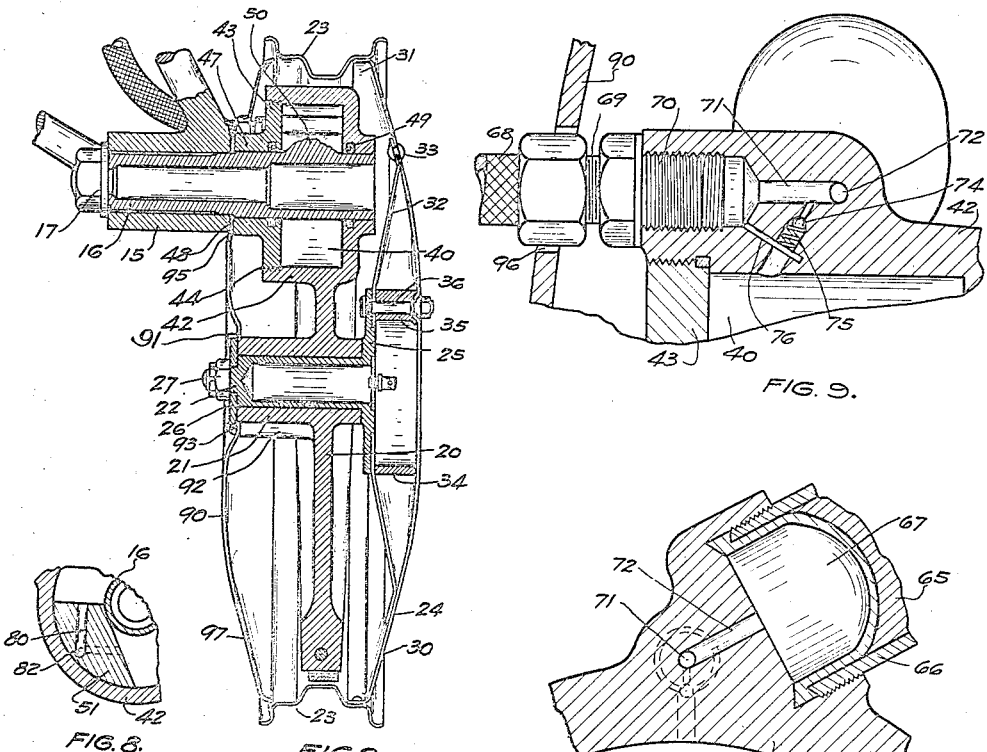
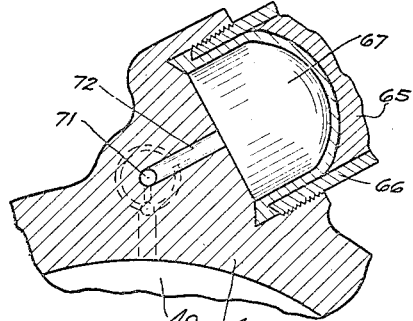
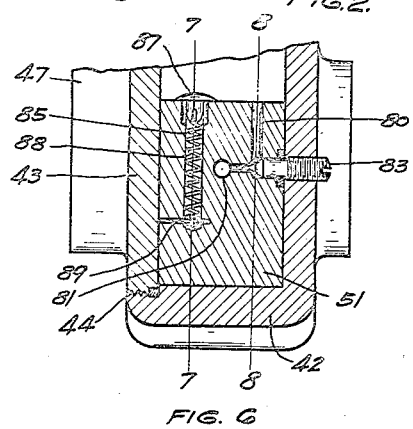
Inventor
JOHN WILLIAM WHITE
By Roberts, Cushman Woodbury
Attorney Oct. 27, 1931.    J. W. WHITE    1,829,575
WHEEL
Filed Jan. 3, 1929    2 Sheets-Sheet 2

Inventor
JOHN WILLIAM WHITE
By Roberts, Cushman & Woodbury
Attorney

Patented Oct. 27, 1931

1,829,575

UNITED STATES PATENT OFFICE

JOHN WILLIAM WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed January 3, 1929. Serial No. 330,106.

The ground wheels of an airplane, which obviously are subjected to severe strains and heavy shocks due to the impact when the airplane lands, must be strongly constructed. Moreover, the wheels must rotate freely when the airplane travels over the ground on these wheels, a procedure commonly referred to as "taxiing". Furthermore, in order to check the travel of the airplane when it lands and to steer the airplane when "taxiing" brakes must be provided to hold one or both wheels against rotation. Finally, the resistance to the wind during the flight of the airplane must be taken into consideration and reduced to a minimum. Hence ground wheels which are satisfactory under all conditions must comply with all the above-recited requirements. Attempts to fulfill all these requirements have been repeatedly made but it has heretofore been found necessary to disregard certain of them or to carry them out in part only.

Shock absorbers to protect the wheels mounted on the supporting struts outside the wheel are quite common but they must of necessity increase the wind resistance of the airplane. Brakes for such wheels are not new but in order to make them satisfactory it has been thought necessary to increase appreciably the weight of the wheels and thus reduce the flying capacity of the airplane. Wheels which revolve or oscillate about a center within the center of rotation do not function satisfactorily at the landing of the airplane because of the limited vertical travel allowed by such construction.

Accidents to airplanes, often fatal to the occupants, results from the contact of the ground wheels with an obstacle as the plane rises from the ground. Such contact causes the plane to tilt forwardly and downwardly, turning on the axis of the line of contact between the wheels and the obstacle.

The primary object of this invention is to provide ground wheels which satisfy completely all the above requirements, in other words, which are strong enough to withstand strains and shocks, which include shock absorbing means to protect the airplane and its occupant, which rotate freely about a centrally located axle, which are provided with positively acting independently controlled brakes and in which the wind resistance is reduced to the minimum determined by the width of the tire.

Another object of this invention is to provide ground wheels which are vertical at all times and are rigidly connected to the body of the airplane in contradistinction to wheels which normally are inclined or dished and attached to the body of the airplane by connections including hinges.

A further object of this invention is to provide ground wheels with shock absorbing means encompassed by the ground wheels and adapted to cushion horizontal and inclined shocks as well as vertical shocks.

A further object of this invention is to provide ground wheels with braking means of the flexible band type so that a deflection in the rim of the wheel will not impair the braking function as would be the case if braking shoes of the rigid type were employed.

Other objects of this invention reside in the details of construction and function of the various elements as will be set forth in the following description and in the drawings which form a part thereof and in which Fig. 1 is a showing, more or less diagrammatic, of an airplane equipped with ground wheels made in accordance with this invention;

Fig. 2 is an enlarged sectional view of one of such ground wheels;

Fig. 5 is a sectional view on an enlarged scale taken along the line 5—5 of Fig. 3;

Fig. 6 is a sectional view taken along the line 6—6 of Fig. 3;

Figure 4:
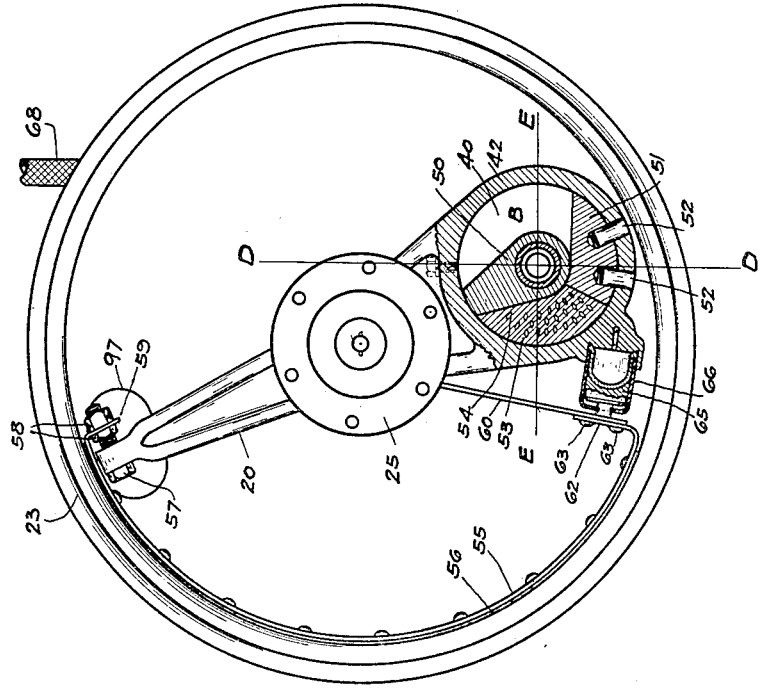
Figs. 3 and 4 are side elevations of such wheels, certain portions being removed in order to show the internal construction, Fig. 3 illustrating the position of the wheel when the plane is in the air and Fig. 4 its position when the plane is on the ground.

Figs. 7 and 8 are sectional views taken along the lines 7—7 and 8—8 of Fig. 5; and Fig. 9 is an enlarged sectional view illustrating the manner of supplying hydraulic pressure to the wheel brake and maintaining the fluid in the shock absorber at normal.

The ground wheels 10 are rigidly supported from the fuselage 11 of the plane by a plurality of struts 12, 13 and 14 which terminate in sleeves 15. In each sleeve is mounted a hollow axle 16 secured against rotation by any suitable means and positioned in the sleeve by means of a nut and washer construction 17. One end of the axle 16 projects beyond the sleeve 15 and carries an arm 20 as a center. The arm 20 is oscillatable about the end of the shaft provided, intermediate its length, with an integral hub 21 which receives a stud shaft 22 to which the rim 23 of the wheel 10 is secured by means of a disk 24. The shaft 22 terminates at one end in a flange 25 at right angles to the hub 21 and is provided at the other end with a washer 26 and nut 27 which coact with the flange 25 to hold the shaft 22 in place in the hub 21, and at the same time to allow free rotation of the shaft in the hub.

The disk 24 preferably comprises an outer plate 30 having at its periphery a flange 31 to which the rim 23 is rigidly secured in any desired manner, as by welding or riveting. In order to strengthen the disk 24 an inner plate 32 is provided, attached by rivets or bolts 33 at its periphery to the outer plate 30, and separated elsewhere from such plate by a spacing ring 34. The spacing ring 34 is provided with a plurality of bosses 35 and the disk 24 is bolted to the flange 25 of the hub 21 by bolts 36 which extend through both plates and through the bosses 35 of the ring 34.

The end of the arm 20 which engages the axle 16 is formed to provide a chamber 40 through which the end of the shaft 16 passes. The chamber 40 is defined by a base 41 and an annular wall 42 concentric with the axis of the axle 16 and is closed at its inner end by a flanged ring 43 preferably secured to the wall 42 of the chamber by threads 44. Between the flange 47 of the ring 43 and the supporting sleeve 15 is inserted a washer 48. The arm 20 is held in its proper position on the axle 16 by wing or block 50 but is free to oscillate thereon. The chamber 40, as will be pointed out below, contains a shock absorbing element and, being adapted to receive fluid, any escape of such fluid is prevented by annular packing glands 49 seated in recesses in the base 41 and ring 43.

Integral with or rigidly secured to the portion of the axle 16 within the chamber 40 is wing or block 50 of such dimensions that it extends substantially the entire distance between the base 41 and the ring 43 and contacts with the wall 42. Mounted on the wall 42 within the chamber 40 is a wing 51 preferably secured in place by pins 52. The block 50 and wing 51 thus divide the chamber 40 into two compartments—a high pressure compartment A and a low pressure compartment B. Inserted in compartment A of the chamber 40 is a cushion 53 of rubber or other suitable material of a compressible nature attached to block 50. Holes 54 in the cushion 53 act to increase the compressibility of the cushion. The compartments of the chamber 40 are filled with a suitable fluid so that the chamber 40 functions as a dashpot or shock absorber to check the movement of the arm 20.

Secured to the other end of the arm 20 is a brake band 55 provided with a brake lining 56. The engagement of the brake band to the end of the arm 20 may be adjusted by means of a bolt 57 and nuts 58, a flange 59 at the end of the band extending between the nuts 58 and being provided with an aperture through which the bolt 57 passes. The opposite end of the brake band is attached to a strip 60 of flexible material fastened at 61 to the arm 20. As shown particularly in Figs. 3 and 4, the end of the brake band which is attached to the strip 60 is flanged at 62 and the parts are rigidly connected by rivets. The brake band normally is retracted under the action of the strip 60 so that it in no way interferes with the free rotation of the wheel in the hub 21.

The brake is brought into the functioning position by fluid pressure means comprising a plunger 65 which is mounted to reciprocate within a housing 66 against the end of which the flange 62 normally is held by the band 60. Pressure introduced into the casing 66 behind the piston 65 forces the piston to advance and carry the brake band out of its normal position into contact with the inner surface of the rim 23. The fluid is supplied through a flexible conduit 68 which terminates in an externally threaded nipple 69 entering a suitably formed pocket 70 in the end of the arm 20 adjacent the chamber 40. The pocket 70 is connected to the compartment 67 by means of conduits 71, 72 which extend at right angles to each other, as will appear from an examination of Figs. 5 and 8. The conduit 71 is also connected to the compartment A of the chamber 40 by a passage 73 normally closed by a ball valve 74 held in that position by a spring 75, one end of which bears against the ball whilst the other end bears against a positioning pin 76 (see Fig. 9).

The compartments A and B in the chamber 40 are connected by an adjustable bypass through the wing 51 consisting of a pair of conduits 80 and 81 at right angles to each other and joined at their inner ends by a passage 82. A needle valve 83 having a conical tip 84 enters the wing 51 through the base 41 and regulates the amount of fluid traveling through the bypass (see Fig. 6). The compartments A and B are also connected by an automatic return bypass comprising conduits 85 and 86 through the wing 51 which meet at substantially right angles, as shown in Fig. 7. At the mouth of the conduit 85 is a valve 87 normally held closed by a spring 88 secured at its lower end to a pin 89 (see Fig. 6). The valve 87 thus prevents fluid in compartment A from escaping through this relief bypass but permits fluid in compartment B to flow through this bypass, thus facilitating restoration of the arm to its normal position.

Secured to the inner end of the hub 21 is a cover plate or disk 90 which is provided with an opening 91 through which the hub and its associated elements pass. One means of so doing is by providing bosses 92 on the hub which receive securing screws 93. The plate 90 is also provided with an opening 95 through which the axle 16 passes, an opening 96 through which the conduit 68 passes, and an opening 97 through which a tool may pass to operate the brake band adjusting means. At its periphery the plate 90 is spaced from the rim 23 so that the wheel rotates independently of the plate.

From the description above given it will be clear that the wheel per se which comprises the rim 23, disk 24 and shaft 22 normally is freely rotatable within the hub 21 and that the arm 20 which carries the hub 21 and the wheel may oscillate about the end of the axle 16, which oscillation, however, is controlled by the elements within the dashpot 40. The flexible conduit 68 and the cover plate 90 travel with the arm. Thus the ground wheel has a movement of rotation controlled by the brake mechanism and a movement of oscillation controlled by the shock absorber mechanism.

Figure 3:
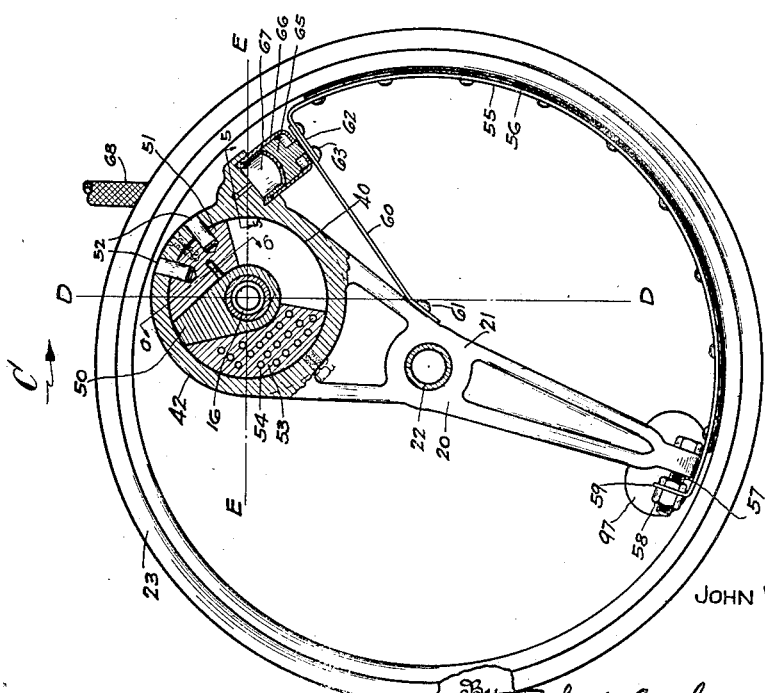

Referring to Figs. 3 and 4, it will be noted that when the plane is in the air the wheel will, under its weight, normally take the position shown in Fig. 3 and swing down from the axle 16, the block 50 and wing 51 being in contact so that the low pressure compartment B is to all intents and purposes non-existent. When the plane, traveling in the direction indicated in Fig. 3 by the arrow C, lands, the contact of the wheel tire (not shown) upon the ground causes the arm 20 to swing about the axle 16. The wing 51 carried by the arm 50 will then travel through the high pressure compartment toward the cushion 53. This movement will be initially resisted by the fluid, which will escape through the conduit 80, passage 82 and conduit 81 from compartment A into compartment B, thus permitting the wing to bear against the cushion 53. As this pressure continues, the cushion will be compresed and the part eventually will take the position shown in Fig. 4. Following the general practice, the brake band 55 will be actuated through the conduit 68 before the plane lands to prevent the free rotation of the wheel on the hub 21, which will act to bring the plane quickly to a standstill. The brakes of the wheels preferably are controlled separately so that when the plane is taxied over the ground either wheel can be locked and the other allowed to rotate freely so as to control the direction of movement of the plane.

The center about which the wheel oscillates is outside its center of rotation so that the vertical component of its movement is of considerable extent. In a wheel constructed as here shown, having a diameter of twenty-one inches, the vertical component is between ten and ten and a half inches or approximately one-half the diameter. The wheel also travels through an arc of approximately 135 degrees. The line D—D on Figs. 3 and 4 designates the plane which passes through the axle both when the airplane is in flight and is on the ground. The line E—E is at right angles to the line D—D in both positions of the axle. A comparison of these figures will illustrate the statements made above as to the travel of the wheel about its center of oscillation. During this movement of the wheel the landing impact of the plane is checked by the shock absorber and the forward travel of the plane is retarded by the brake. As a result the plane is quickly brought to rest without undue shock or jar. It will be noted that all the mechanism is encompassed within the planes of the wheel and is enclosed between the disk 24 and cover plate 90.

When the plane leaves the ground the wheel, under the force of gravity, swings back to the position shown in Fig. 3. The fluid in compartment B returns to compartment A, not only through the conduit 81, passages 82 and conduit 80, but also through the conduits 86 and 85, the valve 87 opening to permit the flow of fluid and the rapid return of the arm 20 to its normal position.

Referring to Fig. 8, it will be noted that when fluid is applied to the brake through the conduit 68, it can also pass through the passage 73 into the chamber 40 and thus will restore the amount of fluid in the chamber to its desired level should there be any loss due to leakage. The ball valve 74, of course, prevents any escape of the fluid into the conduit 71 when the shock absorber is functioning.

While one embodiment of this invention has been shown and described, I am not limited thereto since other embodiments can be made without departing from the spirit and scope of the invention as set forth in the following claims.

I claim:

1. A ground wheel for aircraft including an arm pivotally mounted adjacent one end thereof upon an axle rigidly secured to the craft, the end of the arm being enlarged to form a chamber into which the axle enters and which contains shock absorber elements, one element being fixed to the axle and another being fixed to the wall of the chamber whereby the movement of the arm upon the axle is controlled and a shaft for the wheel rotatably mounted upon the arm intermediate its ends.

2. A mounting for a ground wheel upon an airplane comprising an axle, struts rigidly connecting the axle to the body of the airplane, and an arm pivotally supported upon the axle upon which arm the wheel is mounted free to rotate relative thereto and braking means carried by the arm for controlling the rotation of the wheel.

3. A mounting for a ground wheel upon an aircraft comprising an axle, struts rigidly connecting the axle to the body of the craft, and an arm pivotally supported upon the axle upon which arm the wheel is mounted free to rotate relative thereto, shock absorbing means included in the pivotal support of the arm for controlling such pivotal movement and thereby counteracting the landing impact of the craft and braking means carried by the arm for controlling the rotation of the wheel.

4. A mounting for a ground wheel upon an aircraft comprising an axle, struts rigidly connecting the axle to the body of the craft, and an arm pivotally supported upon the axle upon which arm the wheel is mounted free to rotate relative thereto, an internal brake for controlling the rotation of the wheel, said wheel oscillating in unison with said arm upon the axle, and shock absorbing means rotatable upon the axle.

5. A ground wheel for aircraft comprising a wheel body, a shaft for rotatably supporting the wheel body, an arm pivoted to a support and having a portion spaced from the latter for receiving said shaft, braking means controlling the rotation of the wheel, fluid-operated means for actuating said braking means and shock absorbing means of the fluid type for controlling the pivotal movement of the arm.

6. A ground wheel for aircraft comprising a wheel body, an arm pivotally mounted upon a support and having a portion spaced from the pivotal connection for rotatably supporting the wheel body, braking means controlling the rotation of the wheel, fluid-operated means for actuating said braking means, shock absorbing means of the fluid type for controlling the pivotal movement of the arm and means for introducing fluid into said fluid-operated means and simultaneously into said shock absorbing means.

7. A ground wheel for aircraft comprising a wheel body, an arm pivotally mounted upon a support and having a portion spaced from the pivotal connection for rotatably supporting the wheel body, within the shaft rotates, braking means controlling the rotation of the wheel, fluid-operated means for actuating said braking means, shock absorbing means of the fluid type for controlling the pivotal movement of the arm and a single fluid system for maintaining both braking means and shock absorbing means in operating condition.

8. A ground wheel for aircraft comprising a wheel body, an arm pivotally mounted upon a support and having a portion spaced from the pivotal connection for rotatably supporting the wheel body, braking means of the fluid type carried by the arm and controlling the rotation of the wheel, shock absorbing means of the fluid type including a fluid containing chamber for controlling the pivotal movement of the arm and means for actuating said braking means and simultaneously introducing fluid into said chamber.

9. A ground wheel for aircraft including an arm oscillatable about a fixed point, a rotatable support for the wheel carried by the arm at a point spaced from the point aforesaid permitting both rotation and oscillation of the wheel, and fluid actuated means for controlling both rotation and oscillation of said wheel.

10. A ground wheel for aircraft including an arm pivotally connected adjacent one end to a support for oscillation relative to the latter, means carried by the arm intermediate the ends thereof forming a support about which said wheel rotates, and means carried by said arm for controlling rotation of said wheel.

11. A ground wheel for aircraft including an arm pivotally connected adjacent one end to a support for oscillation relative to the latter, means carried by the arm at a point spaced from the pivotal connection aforesaid for rotatably supporting the wheel upon the arm permitting both oscillation and rotation of the wheel, and means carried by said arm for controlling the rotation and oscillation of said wheel.

Signed by me at Buffalo, New York, this 26th day of December, 1928.

JOHN WILLIAM WHITE.